United States Patent
Kuzniz

(10) Patent No.: US 9,759,883 B1
(45) Date of Patent: Sep. 12, 2017

(54) OPTICAL MODULE AND A DETECTION METHOD

(71) Applicant: APPLIED MATERIALS ISRAEL LTD., Rehovot (IL)

(72) Inventor: Tal Kuzniz, Kfar-Saba (IL)

(73) Assignee: APPLIED MATERIALS ISRAEL LTD., Rehovot (IL)

(*) Notice: Subject to any disclaimer, the term of this patent is extended or adjusted under 35 U.S.C. 154(b) by 0 days.

(21) Appl. No.: 15/069,496

(22) Filed: Mar. 14, 2016

(51) Int. Cl.
*G01T 1/10* (2006.01)
*G02B 6/42* (2006.01)
*G02B 27/30* (2006.01)

(52) U.S. Cl.
CPC ............ *G02B 6/4298* (2013.01); *G01T 1/10* (2013.01); *G02B 6/4212* (2013.01); *G02B 6/4214* (2013.01); *G02B 27/30* (2013.01)

(58) Field of Classification Search
CPC .. G02B 6/4292; G02B 6/4296; G02B 6/4214; G02B 6/4298; G02B 6/4212; G02B 27/30; G01T 1/10
See application file for complete search history.

(56) References Cited

U.S. PATENT DOCUMENTS

| | | | | |
|---|---|---|---|---|
| 3,723,735 A * | 3/1973 | Spelha | ............... | G01T 1/1642 250/227.28 |
| 6,750,456 B1 * | 6/2004 | Majewski | ............ | G01T 1/1644 250/366 |
| 2009/0100900 A1 * | 4/2009 | Spalding | ............ | G01B 11/2504 73/1.81 |
| 2013/0334430 A1 * | 12/2013 | Wang | ................... | G01T 1/2002 250/368 |

* cited by examiner

*Primary Examiner* — David Porta
*Assistant Examiner* — Faye Boosalis
(74) *Attorney, Agent, or Firm* — Kilpatrick Townsend & Stockton LLP

(57) ABSTRACT

An optical module that includes (a) an optical interface that includes an input surface and an output surface, and (b) a scintillator that has a flat surface. The scintillator is configured emit emitted light through the flat surface in response to an impingement of a charged particle on the scintillator. The flat surface is optically coupled to the input surface. The optical interface is configured to (i) receive the emitted light from the scintillator and (ii) output, via the output surface, output light. An optical interface refractive index substantially equals a scintillator refractive index.

17 Claims, 6 Drawing Sheets

Emitting, through a flat surface of a scintillator that as a scintillator refractive index, emitted light. The emitting of the emitted light is responsive to an impingement of a charged particle on the scintillator. 610

Receiving, via an input surface of an optical interface, the emitted light. The optical interface refractive index may substantially equal the scintillator refractive index. At least one of the following is true: (a) The optical interface forms at least a part of a light guide. (b) The input surface is coupled to the flat surface by optical contact coupling. (c) The input surface is attached to the flat surface by an adhesive material that has an adhesive material refraction index that is substantially equal to the scintillator refractive index. 620

Directing the emitted light towards an output surface of the optical interface. 630

Outputting, via an output surface of the optical interface, output light. The output light may propagate through a light guide. 640

OPTICAL MODULE AND A DETECTION METHOD

BACKGROUND OF THE INVENTION

A scintillator (www.wikipedia.org) is a material that exhibits scintillation—the property of luminescence when excited by ionizing radiation. Luminescent materials, when struck by an incoming particle, absorb its energy and scintillate, (i.e., re-emit the absorbed energy in the form of light). Sometimes, the excited state is metastable, so the relaxation back down from the excited state to lower states is delayed (necessitating anywhere from a few nanoseconds to hours depending on the material): the process then corresponds to either one of two phenomena, depending on the type of transition and hence the wavelength of the emitted optical photon: delayed fluorescence or phosphorescence, also called after-glow.

Various tools such as scanning electron microscopes and electron beam inspection tools include a scintillators and a light guide.

The scintillator and the light guide are made of different materials and when the scintillator is flat the optical coupling between the scintillator to the light guide is problematic and results in losing a substantial amount of light.

There is a growing need to collect the light from a scintillator in an efficient manner.

BRIEF SUMMARY OF THE INVENTION

According to an embodiment of the invention there may be provided an optical module that may include (a) an optical interface that may include an input surface and an output surface; and (b) a scintillator that may have a flat surface and has a scintillator refractive index; wherein the scintillator is configured emit emitted light through the flat surface in response to an impingement of a charged particle on the scintillator. The optical interface has an optical interface refractive index. The flat surface is optically coupled to the input surface. The optical interface may be configured to (i) receive the emitted light from the scintillator and (ii) output, via the output surface, output light. The optical interface refractive index substantially equals the scintillator refractive index.

According to an embodiment of the invention there may be provided a method for detection, the method may include: (a) emitting, through a flat surface of a scintillator that as a scintillator refractive index, emitted light; wherein the emitting of the emitted light is responsive to an impingement of a charged particle on the scintillator; (b) receiving, via an input surface of an optical interface, the emitted light; and (c) outputting, via an output surface of the optical interface, output light. The optical interface refractive may equal the scintillator refractive index or differs from the scintillator refractive index by up to ten percent. The output light exits through a region of the output surface at an angle, in relation to the region of the output surface, that ranges between 70 and 110 degrees;

According to an embodiment of the invention at least one of the following is true: (a) the optical interface forms at least a part of a light guide; (b) the input surface is coupled to the flat surface by optical contact coupling; and (c) the input surface is attached to the flat surface by an adhesive material that has an adhesive material refraction index that is substantially equal to the scintillator refractive index.

The output light may exit through a region of the output surface at an angle, in relation to the region of the output surface that ranges between 70 and 110 degrees.

The flat surface may contact the input surface.

The optical interface may include a parabolic mirror that is configured to collimate the emitted light towards the output surface.

The output surface may be shaped as a segment of a three dimensional sphere.

The output surface may have a linear shape.

The output surface may have a non-linear shape.

The optical interface refractive index may equal the scintillator refractive index.

The optical interface refractive index may differ from the scintillator refractive index by up to 10 percent. A difference of up till ten percent is still regarded as substantially equal.

The input surface may be oriented in relation to the output surface.

The optical interface and the scintillator can be are made of Sapphire or of other materials.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 illustrates a method according to an embodiment of the invention.

Figure 1A:
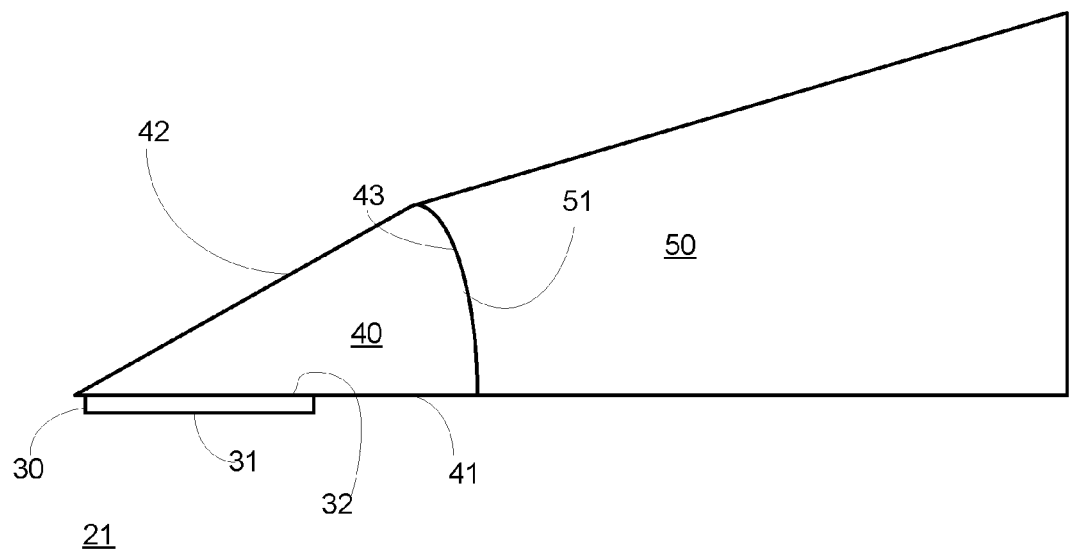
FIG. 1A illustrates an optical module that includes a scintillator, an interfacing module and a light guide according to an embodiment of the invention.

It will be appreciated that for simplicity and clarity of illustration, elements shown in the Figures have not necessarily been drawn to scale. For example, the dimensions of some of the elements may be exaggerated relative to other elements for clarity. Further, where considered appropriate, reference numerals may be repeated among the Figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the Figures have not necessarily been drawn to scale. For example, the dimensions of some of the elements may be exaggerated relative to other elements for clarity. Further, where considered appropriate, reference numerals may be repeated among the Figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

FIG. 1A illustrates an optical module 21 that includes a scintillator 30, an optical interface 40 and a light guide 50 according to an embodiment of the invention.

The optical module can be a stand-alone module, may be a part of an inspection system, may form a detection module or be a part of a detection module.

The optical interface 40 includes an input surface 41 and an output surface 43.

The scintillator 30 has a flat surface 32 and is shown as including another scintillator surface 31. The scintillator 30 has a scintillator refractive index.

The flat surface 32 is not substantially bent or curved.

Scintillator 30 is configured emit emitted light through the flat surface 32 in response to an impingement of a charged particle (such as an electron) on the other scintillator surface 31.

The optical interface 40 has an optical interface refractive index. The flat surface 32 is optically coupled to the input surface 41.

According to an embodiment of the invention the flat surface 32 contacts the input surface 41. The flat surface 32 can contact the input surface 41 without any adhesive or bonding material placed between the flat surface 32 and the input surface 41.

According to an embodiment of the invention the flat surface 32 is coupled to the input surface 41 so there is not gap between the flat surface 32 and the input surface. Alternatively—even if such a gap exists the gap is low enough for evanescing fields low attenuation—for example it does not exceed few tens of nanometers (for example—below 10, 20, 30 nanometers).

Any known method for providing optical contact coupling can be used for coupling the flat surface 32 to input surface 41. For example—each one of the flat surface 32 and the input surface 41 may be polished to match each other at a nanometer scale (for example at an accuracy of about half a nanometer).

When two surfaces (such as flat surface 32 and the input surface 41) have a gap of less than 1 nm over a relatively large area (one square millimeter or more) the Van Der Walls forces between the two surfaces hold the two surfaces to each other. If both bodies are made of the same material, the interface between them cannot be observed at all.

The two surfaces, after being polished are cleaned and are attached to the other. The attaching process may include driving any residual gas or liquid positioned between the two surfaces. The driving out may include spinning one or more of the two surfaces, heat treatment of one or more of the two surfaces and/or applying pressure.

According to an embodiment of the invention the flat surface 32 is connected to the input surface using an adhesive material that has an adhesion material refractive index that substantially equals the refractive index of the scintillator.

Optical interface 40 is configured to (i) receive the emitted light from the scintillator 30 and (b) output, via the output surface 43, output light.

The optical interface refractive index substantially equals the scintillator refractive index—optical interface refractive index may either exactly equal the scintillator refractive index or may differ from the scintillator refractive index by up till ten percent.

The output light exits through a region of the output surface 43 at an angle, in relation to the region of the output surface 43 that range between 70 and 110 degrees. The region of output surface includes the point of the output surface 43 through which the output light exits.

While the emitted light may exit the input surface 41 (and propagate within optical interface 40) at different angles and within a large angular range (almost one hundred and eighty degrees)—the light that exits through the output surface 43 is substantially normal to the output surface and thus does not "escape" from the light guide 50.

According to an embodiment of the invention the output surface 43 may be curved and may even form a part of a sphere. When the output surface 43 is shaped as a part of a sphere then then center of sphere may be proximate to a part of the scintillator (such as the center of the scintillator) from which light exits. Light that is emitted from that part of the scintillator and propagates directly towards the output surface 43 will exit the output surface 43 at about ninety degrees from the point of exit.

Light guide 50 has a light guide input interface 51 that contacts the output surface 43.

In FIG. 1A the optical interface 40 includes intermediate surface 42 in addition to the input surface 41 and to the output surface 43. The intermediate surface 42 may be configured to collimate or otherwise reflect light towards the output surface 43.

In FIG. 1A the intermediate surface 42 is linear.

Figure 1B:
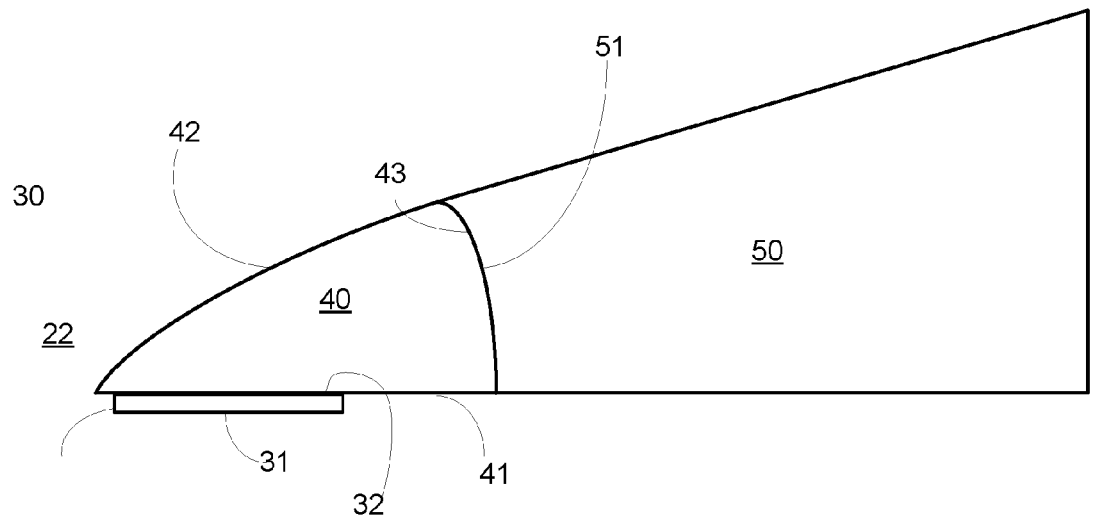
FIG. 1B illustrates an optical module that includes a scintillator, an interfacing module and a light guide according to an embodiment of the invention.

FIG. 1B illustrates optical module 22 that includes an intermediate surface 42 that is shaped as a parabolic mirror.

The output surface 43 may be linear or non-linear. For example—the output surface may be shaped as a segment of a three dimensional sphere.

While in FIGS. 1A and 1B the optical interface 40 was connected to light guide 50 it should be noted that the optical interface 40 may be a part of the light guide 50.

Figure 2A:
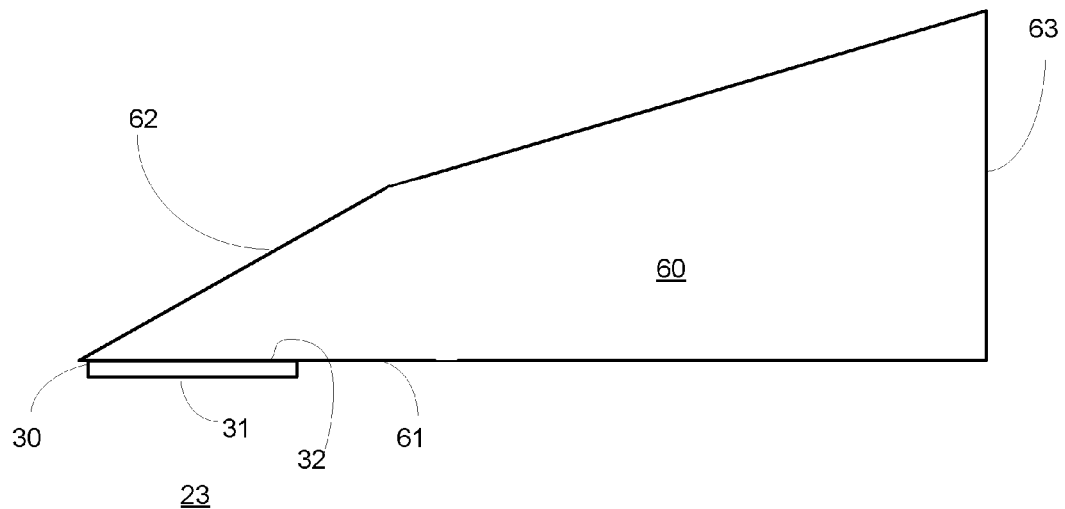
FIG. 2A illustrates an optical module that includes a scintillator and a light guide according to an embodiment of the invention.
Figure 2B:
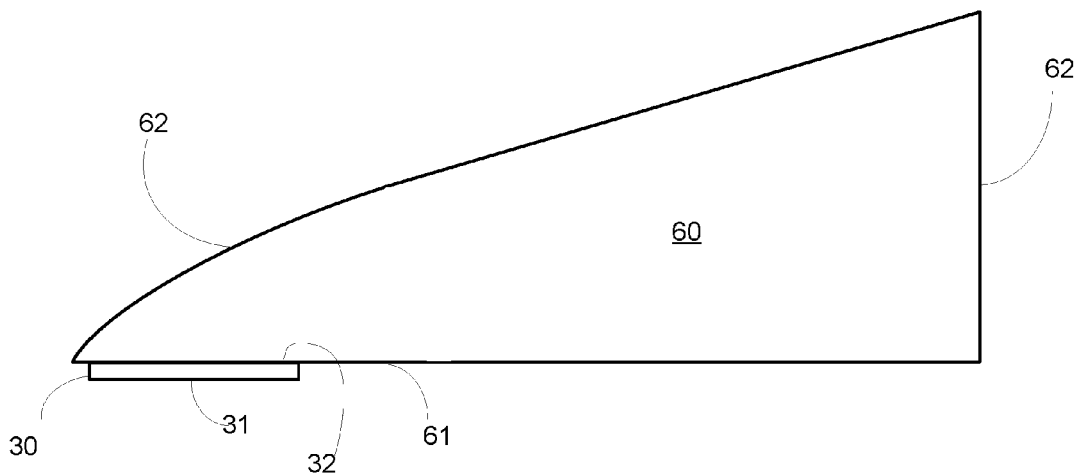
FIG. 2B illustrates an optical module that includes a scintillator and a light guide according to an embodiment of the invention.

FIG. 2A illustrates optical module 23. FIG. 2B illustrates optical module 24.

FIGS. 1A and 2B illustrate a light guide 60 that has an input surface 61, an intermediate surface 63 and an output surface 62. The light guide 60 of FIG. 2A is a combination of the optical interface 40 and the light guide 50 of FIG. 1A. The light guide 60 of FIG. 2B is a combination of the optical interface 40 and the light guide 50 of FIG. 1B.

Figure 3:
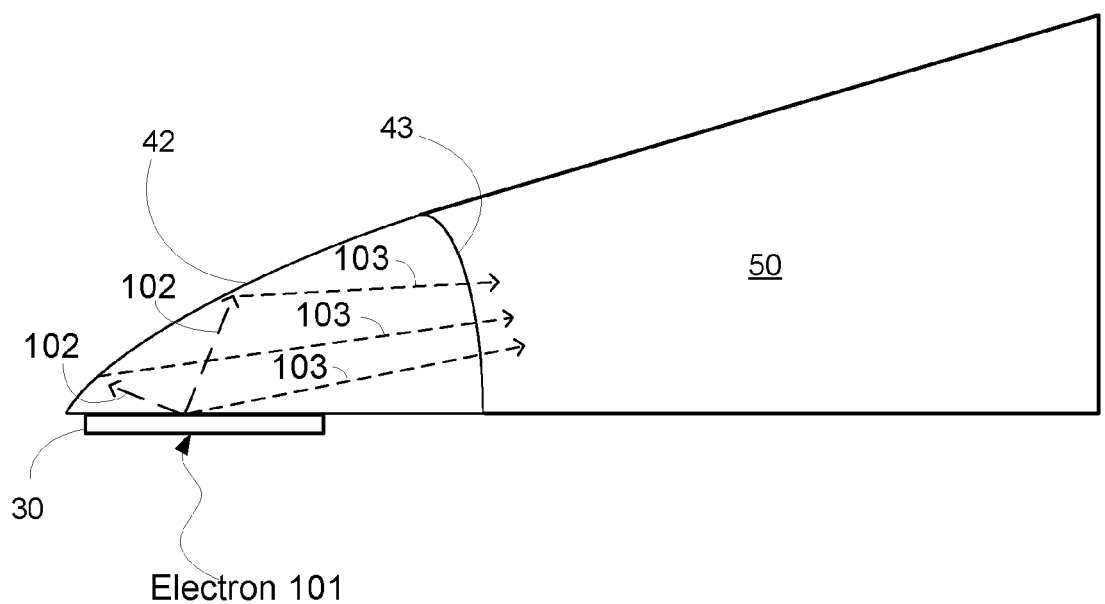
FIG. 3 illustrates a propagation of light within the optical module according to an embodiment of the invention.

FIG. 3 illustrates the propagation of light within an optical module 23 that can be, for example, similar to or identical to optical module 21 shown in FIG. 1A.

Electron 101 impinges onto scintillator 30. This may result in an emission of light rays 102 within optical interface 40. A light ray that is emitted towards the output surface 43 may exit (as output light 103) the output surface 43. A light ray that is emitted towards the intermediate surface 42 may be directed (as output light 103) towards the output surface 43.

According to various embodiments of the invention different parts (segments) of the scintillator are optically coupled to different optical interfaces such as the optical interfaces of FIG. 2A or 2B.

According to various embodiments of the invention different parts (segments) of the scintillator are optically coupled to different light guides such as the light guides of FIG. 2A or 2B.

Figure 4A:
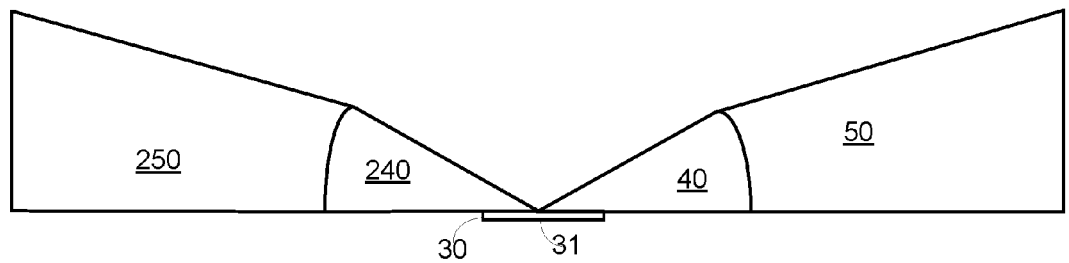
FIG. 4A illustrates an optical module that includes a scintillator, two interfacing modules and two light guides according to an embodiment of the invention.

FIG. 4A illustrates an optical module 25 that includes a scintillator 30 and pair of optical interfaces 40 and 240.

Optical interface 40 is optically coupled between a certain segment of scintillator 30 and light guide 50. Additional optical interface 240 is optically coupled between another segment of scintillator 30 and additional light guide 250.

Figure 4B:
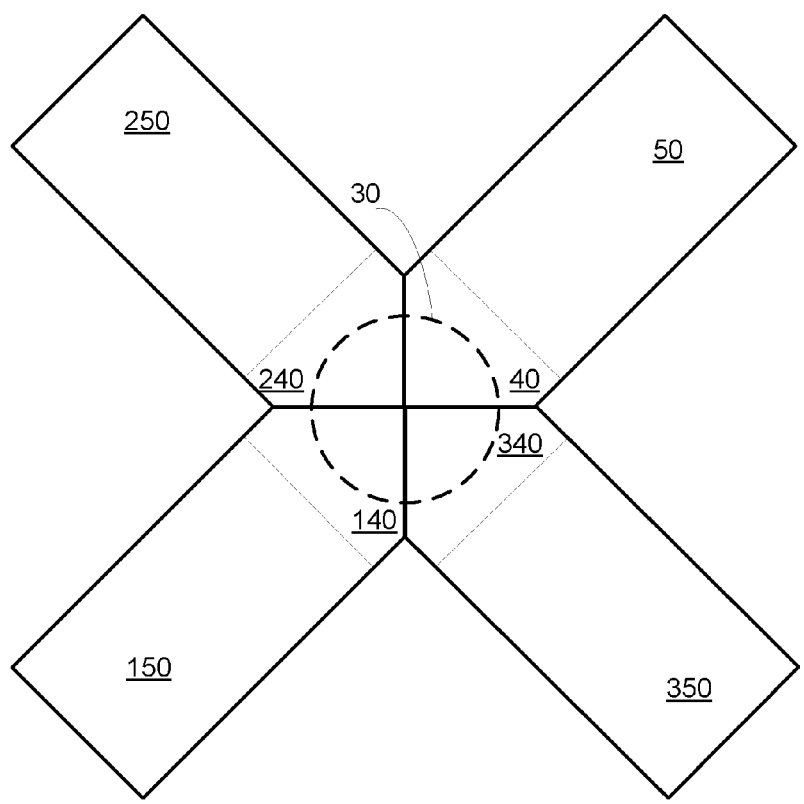
FIG. 4B is a top view of an optical module that includes a scintillator, four interfacing modules and four light guides according to an embodiment of the invention.

FIG. 4B illustrates an optical module 26 that includes a scintillator 30 and four different optical interfaces—interfaces 40, 140, 240 and 340.

Optical interface 40 (also referred to as a first optical interface) is optically coupled between a first segment of scintillator 30 and light guide 50 (also referred to as first light guide).

A second optical interface 140 is optically coupled between a second segment of scintillator 30 and a second light guide 150.

A third optical interface 240 is optically coupled between a third segment of scintillator 30 and a third light guide 250.

A fourth optical interface 340 is optically coupled between a fourth segment of scintillator 30 and a fourth light guide 350.

Figure 5:
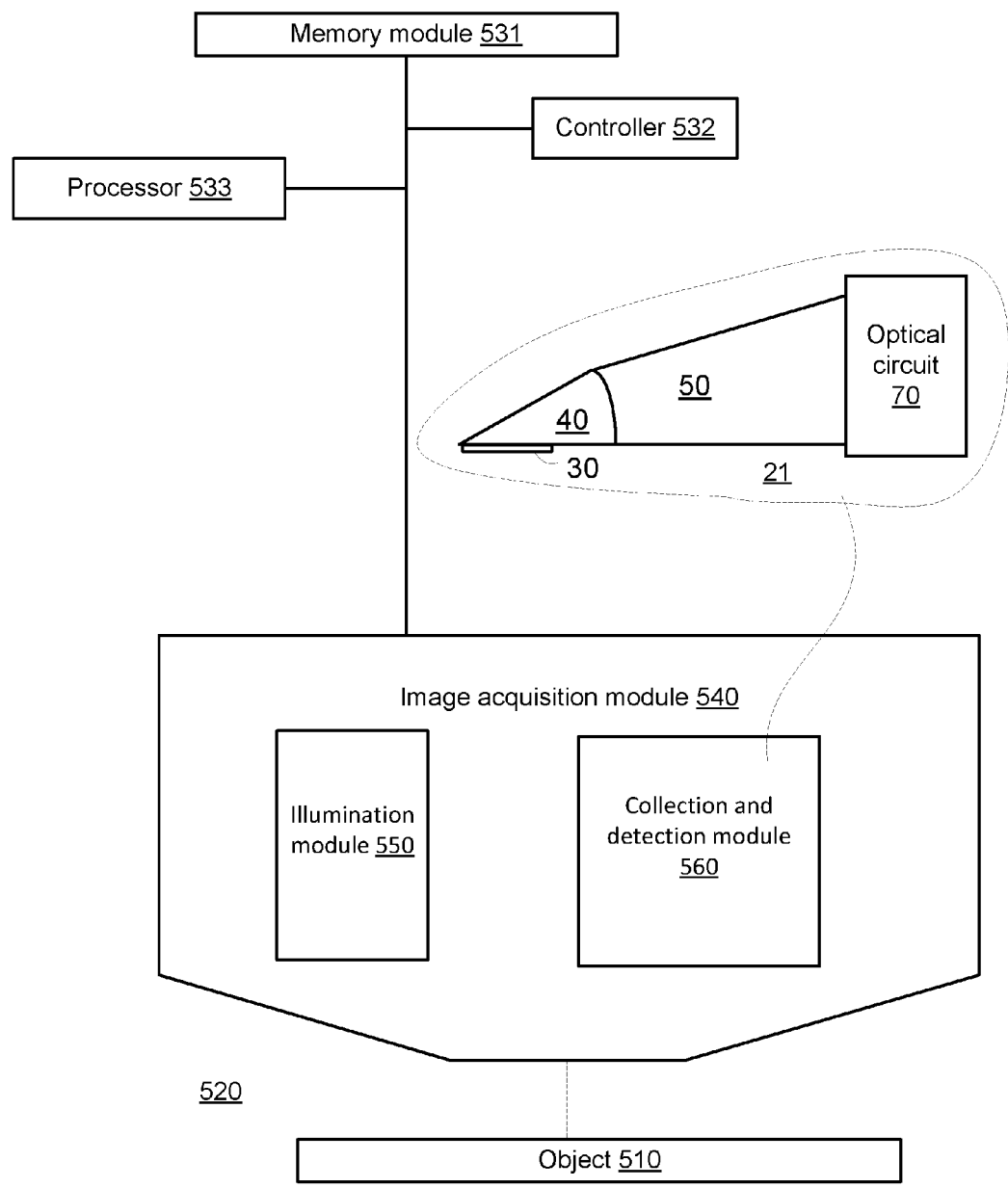
FIG. 5 illustrates a system that includes an optical module according to an embodiment of the invention.

FIG. 5 illustrates a system 520 and an object 510 according to an embodiment of the invention.

The object 510 may be a semiconductor wafer, a flat panel, a solar panel, a lithographic mask or any other object and the like.

The system 520 may be a defect review tool, an electron beam inspection tool and the like.

System 520 includes memory module 531, processor 533, controller 532 and image acquisition module 540.

The controller 532 is configured to control the operation of the various modules and/or components of system 520.

Processor 533 is configured to apply various algorithms on information obtained by the image acquisition module 540. The algorithms may be defect review algorithms, defect detection algorithms, and the like.

The memory module 531 may be configured to store information obtained by the image acquisition module 540, the outcome of the processing that was applied by the processor 533, inspection recipes, defect review recipes, and the like.

Image acquisition module 540 may include illumination module 550 as well as collection and detection module 560.

Illumination module 550 and collection and detection module 570 may be separate modules or may share one or more components. For example, the illumination module 550 and collection and detection module 560 may share an objective lens.

The image acquisition module 540 may include one or more charged particle columns.

Illumination module 550 may be configured to illuminate substrate 510 with one or more electron beams thereby generating one or more collected electron beams. The one or more collected electron beams may be reflected and/or scattered from substrate or interact with the substrate in other manners.

The one or more collected electron beams may be converted to light beams by one or more modules such as optical module 21.

Collection and detection module 560 may include an optical circuit 70 and optical module 21. Optical module 21 may be replaced by any of the optical modules illustrated in FIGS. 1B, 2A, 2B, 4A and 4B. The optical circuit may 70 process, amplify, attenuate, and/or convert the output light that is outputted from the optical module 21.

FIG. 6 illustrates method 600 according to an embodiment of the invention.

Method 600 includes stages 610, 620 and 630.

Stage 610 may include emitting, through a flat surface of a scintillator that has a scintillator refractive index, emitted light. The emitting of the emitted light is responsive to an impingement of a charged particle on the scintillator.

Stage 610 may be followed by stage 620 of receiving, via an input surface of an optical interface, the emitted light.

The optical interface refractive index may substantially equal the scintillator refractive index.

According to various embodiment of the invention at least one of the following is true:

a. The optical interface forms at least a part of a light guide.
b. The input surface is coupled to the flat surface by optical contact coupling.
c. The input surface is attached to the flat surface by an adhesive material that has an adhesive material refraction index that is substantially equal to the scintillator refractive index.

Stage 620 may be followed by stage 630 of directing the emitted light towards an output surface of the optical interface.

Stage 630 may be followed by stage 640 of outputting, via an output surface of the optical interface, output light. The output light may propagate through a light guide.

The output light may exit through a region of the output surface at an angle, in relation to the region of the output surface that ranges, for example, between 70 and 110 degrees.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An optical module, comprising:
    an optical interface having an optical refractive index, the optical interface comprises an input surface and an output surface; and
    a scintillator comprising a flat surface optically coupled to the input surface and being configured to emit emitted light through the flat surface in response to an impingement of a charged particle on the scintillator;
    wherein the optical interface is configured to (i) receive the emitted light from the scintillator and (ii) output, via the output surface, output light and wherein at least one of the following is true: (a) the optical interface forms at least a part of a light guide, (b) the input surface is coupled to the flat surface by optical contact coupling, or (c) the input surface is attached to the flat surface by an adhesive material that has an adhesive material refraction index that is substantially equal to the scintillator refractive index; and
    wherein the optical interface refractive index differs from the scintillator refractive index by up to 10 percent.

2. The optical module according to claim 1 wherein the output light exits through a region of the output surface at an angle, in relation to the region of the output surface, that ranges between 70 and 110 degrees.

3. The optical module according to claim 1 wherein the flat surface contacts the input surface.

4. The optical module according to claim 1 wherein the optical interface comprises a parabolic mirror that is configured to collimate the emitted light towards the output surface.

5. The optical module according to claim 1 wherein the output surface is shaped as a segment of a three dimensional sphere.

6. The optical module according to claim 1 wherein the output surface has a linear shape.

7. The optical module according to claim 1 wherein the output surface has a non-linear shape.

8. The optical module according to claim 1 wherein the optical interface refractive index equals the scintillator refractive index.

9. The optical module according to claim 1 herein the input surface is oriented in relation to the output surface.

10. The optical module according to claim 1 wherein the optical interface and the scintillator are made of Sapphire.

11. The optical module according to claim 1 wherein the optical interface forms at least a part of a light guide.

12. The optical module according to claim 1 wherein the input surface is coupled to the flat surface by an optical contact coupling.

13. The optical module according to claim 1 wherein the input surface is attached to the flat surface by an adhesive material that has an adhesive material refraction index that is substantially equal to the scintillator refractive index.

14. A method for detection, the method comprises:
emitting, through a flat surface of a scintillator that as a scintillator refractive index, emitted light; wherein the emitting of the emitted light is responsive to an impingement of a charged particle on the scintillator;
receiving, via an input surface of an optical interface that has an optical refractive index, the emitted light;
outputting, via an output surface of the optical interface, output light through a region of the output surface at an angle, in relation to the region of the output surface, that ranges between 70 and 110 degrees;
wherein the optical interface refractive index differs from the scintillator refractive index by up to 10 percent; and
wherein at least one of the following is true: (a) the optical interface forms at least a part of a light guide, or (b) the output surface of the optical interface directly contacts a portion of the light guide.

15. The method according to claim 14 wherein the optical interface comprises a parabolic mirror that is configured to collimate the emitted light towards the output surface.

16. The method according to claim 14 wherein the output light exits through a region of the output surface at an angle, in relation to the region of the output surface, that ranges between 70 and 110 degrees.

17. The method according to claim 14 wherein the flat surface contacts the input surface.

* * * * *